(12) United States Patent
Kong et al.

(10) Patent No.: US 8,146,804 B2
(45) Date of Patent: Apr. 3, 2012

(54) CASH TRANSACTION MACHINE

(75) Inventors: Je Seok Kong, Busan (KR); Kyoung Bin Im, Gyeonggi-do (KR); Won Joon Lee, Seoul (KR); Jin Hwan Cha, Gyeonggi-do (KR); Young Il Choi, Seoul (KR)

(73) Assignee: Nautilus Hyosung Inc., Seoul (KR)

( * ) Notice: Subject to any disclaimer, the term of this patent is extended or adjusted under 35 U.S.C. 154(b) by 652 days.

(21) Appl. No.: 12/338,214

(22) Filed: Dec. 18, 2008

(65) Prior Publication Data

US 2009/0160127 A1 Jun. 25, 2009

(30) Foreign Application Priority Data

Dec. 21, 2007 (KR) .................. 10-2007-0134990
Dec. 28, 2007 (KR) .................. 10-2007-0140852

(51) Int. Cl.
*G07D 11/00* (2006.01)
*G07F 19/00* (2006.01)

(52) U.S. Cl. ............ 235/379; 235/375; 705/43; 902/8; 902/9; 902/12; 902/13; 902/14; 902/15

(58) Field of Classification Search ............... 235/379, 235/375, 487; 902/7–15; 705/43
See application file for complete search history.

(56) References Cited

U.S. PATENT DOCUMENTS

| 5,101,979 A * | 4/1992 | Uno et al. .................. 209/534 |
| 2002/0014736 A1* | 2/2002 | Katou et al. .................. 271/126 |
| 2007/0007707 A1* | 1/2007 | Abe et al. .................. 271/97 |

FOREIGN PATENT DOCUMENTS

| JP | H08-096214 | 4/1996 |
| JP | H09-301547 | 11/1997 |
| JP | 2003-151008 | 5/2003 |
| KR | 2007-51989 | 5/2007 |

* cited by examiner

*Primary Examiner* — Edwyn Labaze
(74) *Attorney, Agent, or Firm* — Fenwick & West LLP

(57) ABSTRACT

Provided is a cash transaction machine including: a medium storage portion; a medium transfer module transferring a paper medium in a sheet unit from the medium storage portion; a temporary stack portion including an upwardly and downwardly movable supporter being provided to be adjacent to an outlet of the medium transfer module to stack the paper medium; a carriage receiving the paper medium from the supporter; and a carriage transfer portion transferring the carriage to a medium outlet in a state where stacked paper media is pressed, wherein the carriage includes a holder being provided in parallel with a moving direction of the carriage to support a bottom surface of the stacked paper media. The cash transaction machine may be constructed to enable a stack of paper media to maintain its arranged state while the paper media is being transferred and to simplify a transferring structure of paper media.

21 Claims, 13 Drawing Sheets

CASH TRANSACTION MACHINE

CROSS-REFERENCE TO RELATED APPLICATIONS

This application claims the benefit of Republic of Korea Patent Application No. 10-2007-0134990, filed on Dec. 21, 2007, and Republic of Korea Patent Application No. 10-2007-0140852, filed on Dec. 28, 2007, in the Korean Intellectual Property Office, the disclosures of which are incorporated herein by reference.

BACKGROUND

1. Field of the Invention

The present invention relates to a cash transaction machine, and more particularly, to a cash transaction machine that may temporarily store, in a temporary stack portion, a paper medium that is supplied in a sheet unit and then may collectively discharge the stored paper media.

2. Description of the Related Art

A cash transaction machine denotes an automated device that may provide basic financial services such as deposit and withdrawal in association with financial services, without a need of a banking teller and without a restriction on a time and an occasion.

The cash transaction machine may be generally classified into a cash withdrawing device and a cash depositing device according to deposit and withdrawal. Currently, the cash transaction machine is being used for various purposes such as depositing/withdrawing of a check, a bankbook arrangement, depositing of a gyro, ticketing, and the like.

Generally, the cash transaction machine may pick up and transfer a paper medium in a sheet unit from a paper medium storage portion. The transferred paper medium may be directly moved to a dispensing portion, or may be temporarily stored in a temporary stack portion and then be moved to the dispensing portion. When using the temporary stack portion, the paper medium may be provided to a customer in a stack unit.

However, in this case, paper media stored in the temporary stack portion may need to be arranged to be transferable to a transfer module. The transfer module for transferring the paper media in a stack unit may need to transfer a single sheet of paper medium or a stack of paper media. Therefore, the transfer module may need to transfer the stack of paper media with appropriately pressing the stack of paper media.

Also, due to a friction between a pressing member and media stored in the temporary stack portion that may occur in pressing the media, the media may be transferred in a state where the media is not well arranged.

SUMMARY

An aspect of the present invention provides a cash transaction machine that may maintain a stacked state of paper media when transferring the paper media in a stack unit.

Another aspect of the present invention also provides a cash transaction machine including a carriage to stably transfer a stack of paper media.

Another aspect of the present invention also provides a cash transaction machine including a stopper to retrieve a stack of paper media not received by a user.

Another aspect of the present invention also provides a cash transaction machine that may reduce interference with paper media while transferring the paper media from a temporary stack portion to another module.

Another aspect of the present invention also provides a cash transaction machine that may smoothly transfer a paper medium in correspondence to droop of the paper medium.

According to an aspect of the present invention, there is provided a cash transaction machine including: a medium storage portion; a medium transfer module transferring a paper medium in a sheet unit from the medium storage portion; a temporary stack portion including an upwardly and downwardly movable supporter that is provided to be adjacent to an outlet of the medium transfer module to stack the paper medium; a carriage receiving the paper medium from the supporter; and a carriage transfer portion transferring the carriage to a medium outlet in a state where stacked paper media is pressed, wherein the carriage includes a holder being provided in parallel with a moving direction of the carriage to support a bottom surface of the stacked paper media, and a carriage interference preventing portion is formed in the supporter to prevent interference with the holder.

In this instance, the carriage transfer portion may include: a belt being synchronized with the carriage to move together with the carriage; and a plurality of guide rollers being provided along a travel path of the carriage to define a travel path of the belt, wherein the stacked paper media is pressed via the belt.

Through the above configuration, it is possible to provide a customer with well-arranged paper media without destructing an arranged state of paper media stacked in a temporary stack portion and to simplify a carriage transfer structure.

Also, through the above configuration, it is possible to discharge paper media with maintaining an arranged state of stacked paper media and a loaded state thereof, and to simplify a transferring structure of the stacked paper media.

According to another aspect of the present invention, there is provided a cash transaction machine including: a medium storage portion; a medium transfer module transferring a paper medium in a sheet unit from the medium storage portion; a temporary stack portion comprising an upwardly and downwardly movable supporter that is provided to be adjacent to an outlet of the medium transfer module to stack the paper medium; a carriage receiving the paper medium from the supporter; a carriage transfer belt transferring the carriage to a medium outlet in a state where stacked paper media is pressed; a plurality of guide rollers being provided along a travel path of the carriage to define a travel path of the carriage transfer belt; and a clutch controlling a power transfer state between the medium transfer module and the carriage transfer belt.

In this instance, the medium transfer module may include: an endless belt transferring the paper medium; and a motor driving the endless belt. The clutch may be provided between the motor and one of the guide rollers.

Through the above configuration, it is possible to omit a motor to transfer a carriage and thereby reduce a manufacturing cost.

According to still another aspect of the present invention, there is provided a cash transaction machine including: a medium storage portion; a medium transfer module transferring a paper medium in a sheet unit from the medium storage portion; a temporary stack portion comprising an upwardly and downwardly movable supporter that is provided to be adjacent to an outlet of the medium transfer module to stack the paper medium; and a carriage receiving the paper medium from the supporter to transfer the paper medium to a medium outlet, wherein the carriage comprises a plurality of fork portions being provided in parallel with a moving direction of the carriage, and the supporter comprises a plurality of receiving grooves receiving the plurality of fork portions respectively, and a top surface of the supporter or the fork portions is formed to have a different height.

An end portion of paper media may be curved or bent to thereby be positioned in a portion of a receiving groove of the supporter. In this case, when a fork portion of the carriage is inserted into the receiving groove of the supporter, interference may occur between the fork portion and the paper medium. An end portion of the fork portion may push away a bottom paper medium.

Here, it is possible to make a top surface of the supporter have a different height and thereby prevent the end portion of paper media from being hanged in the receiving groove. For example, that the top surface of the supporter has the different height may indicate that the top surface of the supporter defined between two receiving grooves is downwardly inclined towards a central portion of the supporter. For another example, it may indicate that the top surface of the supporter defined between two receiving grooves may have a stepped structure where an outer top surface is relatively higher than an inner top surface based on the central portion of the supporter. Also, for still another example, it may indicate that the top surface of the supporter defined between two receiving grooves is formed to have a planar surface, an inclined surface, or a stepped surface. Here, an outer top surface may be generally higher than another inner top surface based on the central portion of the supporter.

It is possible to form the top surface of the fork portion to have a different height and thereby to prevent an end portion of paper media from interfering with the fork portion in the receiving groove. For example, forming the top surface of the fork portion to have the different height may indicate that an outer fork portion, among the plurality of fork portions based on the central portion of the supporter, is provided in a lower location than an inner fork portion. For another example, it may indicate that the outer fork portion, among the plurality of fork portions based on the central portion of the supporter, may have a downwardly inclined top surface towards an outside.

BRIEF DESCRIPTION OF THE DRAWINGS

These and/or other aspects, features, and advantages of the invention will become apparent and more readily appreciated from the following description of exemplary embodiments, taken in conjunction with the accompanying drawings.

DETAILED DESCRIPTION

Figure 1:
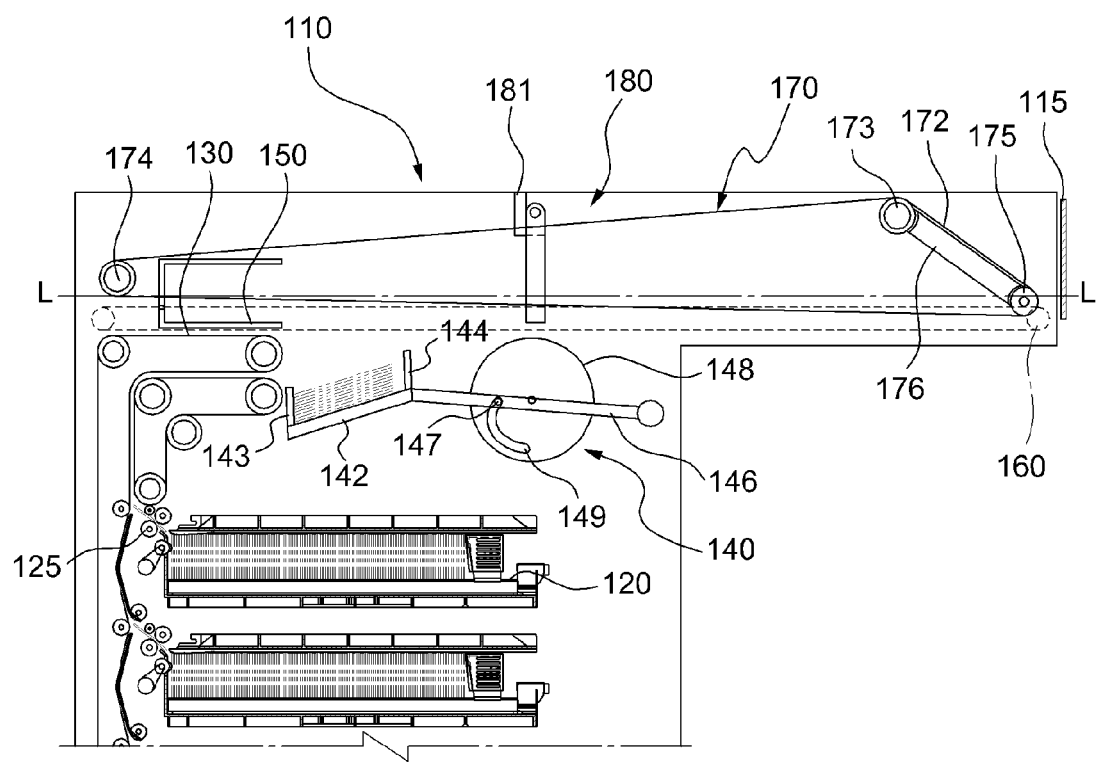
FIG. 1 is a cross-sectional view illustrating a cash transaction machine according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a cross-sectional view illustrating a cash transaction machine according to an embodiment of the present invention, and FIG. 2, FIG. 3, FIG. 4, and FIG. 5 are cross-sectional views for describing an operation mechanism of the cash transaction machine of FIG. 1.

Referring to FIG. 1, the cash transaction machine includes a medium storage portion 120, a medium transfer module 130, a temporary stack portion 140, a carriage 150, a carriage transfer portion 160, and a belt pressing portion 170 that are provided in a housing 110.

A paper medium may be picked up and be supplied in a sheet unit from the medium storage portion 120. The supplied paper medium may be transferred to the temporary stack portion 140 via the medium transfer module 130. Paper media may be supplied in the sheet unit and be stacked in the temporary stack portion 140. When paper media is stacked as many sheets as a customer desires to withdraw, a bundle or a stack of paper media stacked in the temporary stack portion 140 may be transferred to the carriage 150. The stack of paper media transferred to the carriage 150 may move to a medium outlet 115 together with the carriage 150. The customer may collect the paper media from the medium outlet 115 in a stack unit.

In this instance, the belt pressing portion 170 may transfer the carriage 150 with pressing a top surface of the stacked paper media being transferred by the carriage 150. While the paper media is being transferred for payment of the paper media, or when the customer does not collect the paper media, the belt pressing portion 170 may pressurize the paper media so that the paper media may not be dispersed and may maintain its stable state. Here, the belt pressing portion 170 and the carriage transfer portion 160 may be integrally formed.

Hereinafter, a function of each constituent element will be further described in detail.

The medium storage portion 120 may maintain a paper medium such as a check, a bill, a gift, a ticket, and the like. When the customer desires to withdraw a predetermined number of paper media, a main controller (not shown) of the cash transaction machine may order the predetermined number of paper media to be discharged from maintained paper media.

A pick-up module 125 may be provided, as an internal type or as an external type, in the medium storage portion 120. The pickup module 125 may pick up the predetermined number of paper media from the medium storage portion 120 in a sheet unit, that is, one by one. Generally, the pickup module 125 may include a pickup roller, a feed roller, a gate roller, a pinch roller, and the like. Those skilled in the art may readily understand a configuration and a function thereof and thus further detailed description related thereto will be omitted here.

A paper medium picked up and supplied from the medium storage portion 120 may be transferred to the temporary stack portion 140 via the medium transfer module 130. In the present embodiment, although the medium transfer module 130 adopts a transfer scheme consisting of a belt and a roller, the medium transfer module 130 may transfer the paper medium according to a transfer scheme using a roller and a guide plate depending on embodiments. The temporary stack portion 140 may be provided to be adjacent to an outlet of the medium transfer module 130. The paper medium may be stacked in the sheet unit to thereby become a stack of paper media in the temporary stack portion 140.

Referring to FIG. 1, the temporary stack portion 140 includes a supporter 144, a front wall 144, a rear wall 143, and a stack elevator. The stack elevator includes a rotation supporter 146 and a rotation guide 148 that performs a cam function. The supporter 142 and the rotation supporter 146 may be integrally formed, and upwardly and downwardly move through a rotary motion of the rotation supporter 146. Specifically, the supporter 142 may be positioned to be adjacent to the outlet of the medium transfer module 130 and may also be positioned in an upwardly moved location for transfer of the carriage 150.

A pressure preventing portion (not shown) may be formed in any one of the front wall 144 and the rear wall 143. The pressure preventing portion may be formed in an upper portion of the front wall 144 or the rear wall 143 to lift up a belt of the belt pressing portion 170 when the supporter 142 is moved up.

Here, it is possible to form a curved surface in a portion of the pressure preventing portion that may directly make a contact with the belt of the belt pressing portion 170 and thereby prevent damage to the belt of the belt pressing portion 170.

The pressure preventing portion may be provided only in either the front wall 144 or the rear wall 143, or may also be provided in the rotation guide 148. Also, the pressure preventing portion may be provided in the housing 110 to thereby lift up the belt of the belt pressing portion 170 in interoperation with moving up of the supporter 142.

A stack driving unit (not shown) such as a motor and the like may be provided to drive the rotation guide 148.

The front wall 144 and the rear wall 143 may be provided in a front end and a rear end of the supporter 142, respectively. The front wall 144 may stop an advance of the paper medium being discharged from the medium transfer module 130. When a sheet roller (not shown) is provided in the outlet of the medium transfer module 130, the paper medium may temporarily maintain its stopped state by the front wall 144 and then may be guided to be moved down by the sheet roller. The rear wall 143 may guide paper media to be stacked on the supporter 142 in an arranged state. The supporter 142 may be provided to be downwardly inclined in front of the outlet of the medium transfer module 130.

As shown in the figures, a spiral guide groove 149 having a different radius upon a rotation angle may be formed in the rotation guide 148. A protrusion 147 may be formed in the rotation supporter 146 to be coupled with the guide groove 149. Accordingly, when the rotation guide 148 rotates clockwise based on the figure, the rotation supporter 146 may be moved up. Conversely, when the rotation guide 148 rotates counterclockwise based on the figure, the rotation supporter 146 may be moved down.

Although the present embodiment provides the temporary stack portion 140 constructed as above, the present invention is not limited thereto. Specifically, various types of temporary stack portions may be provided. Also, those skilled in the art may variously select and use a device for elevating the supporter 142 in the related art.

The carriage 150 may be provided in the structure to be partially overlapped with the supporter 142 of the temporary stack portion 140. Generally, the carriage 150 may be provided in a fork shape including a plurality of supporters. The specific shape of the carriage 150 will be described later in detail.

When the supporter 142 is moved up to be positioned in an upper location, the carriage 150 may move forward whereby a lower portion of the carriage 150 may be inserted into the supporter 142 to be positioned below the stacked paper media.

The belt pressing portion 170 may be provided above the carriage 150 or both sides of the carriage 150. The belt pressing portion 170 may transfer the carriage 150 and pressurize a top surface of the paper medium or a stack of paper media at the same time. The belt pressing portion 170 may enable the paper media to be transferred in a well-arranged state.

For this, the belt pressing portion 170 includes a belt 172 for simultaneously transferring the carriage 150 and pressing the top surface of paper media in the entire moving section of the carriage 150 and a plurality of guide rollers for defining a travel path of the belt 172. Two or more rows of belts 172 may be provided in order to stably pressurize the paper media.

The plurality of guide rollers may include a front fixed roller 173, a rear fixed roller 174, and a front moving roller 175 that is vertically swiveled with maintaining a predetermined distance with the front fixed roller 173. A support member 176 may be interposed between the front fixed roller 173 and the front moving roller 175.

Specifically, the support member 176 may be mounted on a rotation shaft of the front fixed roller 176. The front moving roller 175 may be rotatably mounted on an end of the support member 176. Accordingly, the front moving roller 175 may be vertically swiveled together with the support member 176. When the carriage 150 approaches the front moving roller 175, the front moving roller 175 may be moved up together with the support member 176. Conversely, when the carriage 150 is withdrawn from the front moving roller 175, the front moving roller 175 may be moved down.

The belt 172 may be stopped without regard to the carriage 150 and may also move by the same displacement as that of movement of the carriage 150 in order to reduce a friction between the belt 172 and the paper media.

In addition to the belt 172 and the guide rollers 173, 174, and 175, an additional pressing belt (not shown) may be provided. Specifically, the additional pressing belts may be provided in both sides of the belt 172.

In this instance, a number of required belts may increase. A separate configuration such as a one-way clutch and the like may be further provided to interoperate the belt 172 with the pressing belts.

According to an embodiment of the present invention, since the carriage 150 is transferred and the paper media is pressed at the same time using the belt 172, there is no need to mount an additional pressing belt.

Also, as shown in FIG. 1, the belt 172 may be downwardly inclined along a forward direction of the carriage 150 or with respect to the horizontal line. Specifically, when a line L-L of FIG. 1 is the forward direction of the carriage 150 or the horizontal line, a lower portion of the belt 172, that is, a portion of pressing the top surface of paper media may be downwardly inclined with respect to the line L-L. By forming the belt 172 to be downwardly inclined along the forward direction of the carriage 150, although the belt 172 is lifted up by the pressure preventing portion and the like, it is possible to maintain a minimum contact between the paper media and the belt 172.

The force of transferring a stack of paper media to the medium outlet 115 may become a drive force of the carriage 150 and the belt 172. The belt 172 also functions to press the top surface of paper media. Specifically, the stack of paper media may not be transferred due to the friction between the belt 172 and the paper media.

Also, when a paper medium is not withdrawn or is not collected by a customer and thereby remains in the carriage 150, the paper medium may need to be separated from the carriage 150 and be retrieved. For this, a stopper 180 may be provided in the travel path of the carriage 150.

Referring to FIG. 1, the stopper 180 may be provided in the housing 110 to be positioned in the travel path defined by the belt 172 and may perform a pivot motion along the forward direction of the carriage 150. Specifically, when the carriage 150 moves forward, a paper medium loaded in the carriage 150 may not be stopped by the stopper 180. When the carriage 150 moves backward, the paper medium loaded in the carriage 150 may be stopped by the stopper 180. Through this, the paper medium may be separated from the carriage 150.

The separated paper medium may be collected in a separately mounted retrieval box (not shown). In this instance, the retrieval box may be provided below the stopper 180.

So that the stopper 180 may perform the pivot motion only in the forward direction of the carriage 150, an upper end of the stopper 180 may be connected to the housing 110 via a hinge. A fixing member 181 may be separately mounted onto one side of the stopper 180 to thereby prevent the stopper 180 from performing the pivot motion when the carriage 150 moves backward.

The stopper 180 may be in the structure of preventing interference with the carriage 150. A lower end of the stopper 180 may be partially overlapped with a medium holding surface of the carriage 150. In this instance, an interference preventing portion (not shown) may be provided in the carriage 150 to prevent a collision or contact between the lower end of the stopper 180 and the carriage 150. A specific shape of the stopper 180 will be further described in detail later.

Hereinafter, an operation of a cash transaction machine according to an embodiment of the present invention will be described with reference to FIGS. 2 through 5.

Figure 2:
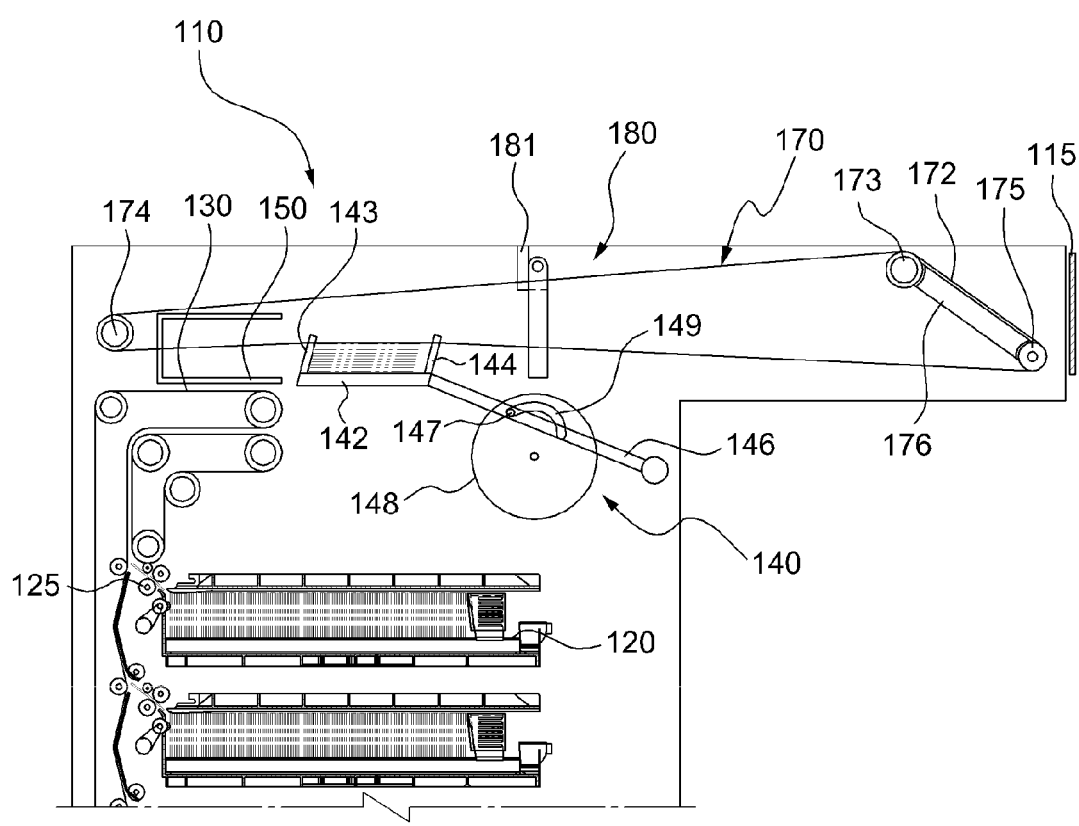
FIG. 2, FIG. 3, FIG. 4, and FIG. 5 are cross-sectional views for describing an operation mechanism of the cash transaction machine of FIG. 1.

As shown in FIG. 2, when a desired amount of paper media is stacked in the supporter 142 of the temporary stack portion 140, the rotation guide 148 may rotate clockwise to lift up the supporter 142. In this instance, the paper media stacked in the supporter 142 may make a contact with the bottom surface of the belt pressing portion 170 and maintain its arranged state by the belt 172. Here, the belt 172 may be in a state of pressing the top surface of the stacked paper media loaded in the temporary stack portion 140. When a pressure preventing portion (not shown) is provided, it may prevent the top surface of paper media loaded in the supporter 142 of the temporary stack portion 140 from being excessively pressed by the belt 172, or may prevent a friction between the belt 172 and the paper media.

Figure 3:
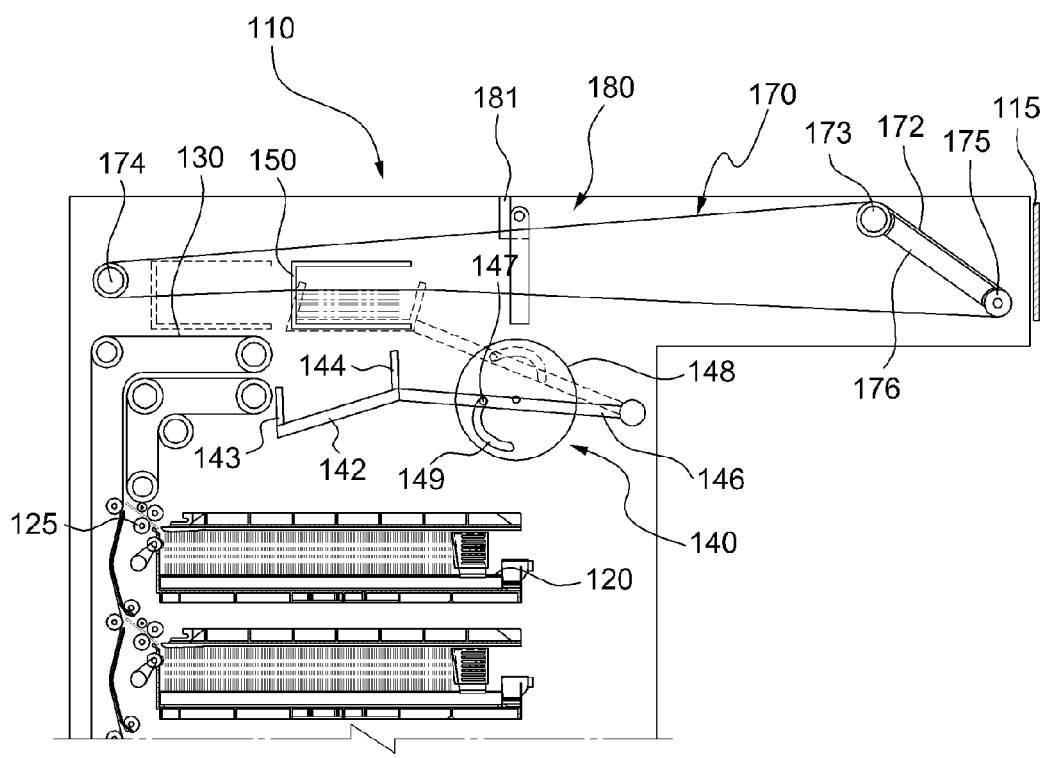

Referring to FIG. 3, the carriage 150 may move forward towards the medium outlet 115 and thereby be overlapped with the supporter 142 of the temporary stack portion 140. In this instance, a lower portion of the carriage 150 may be internally received along a groove of the supporter 142. When the rotation guide 148 rotates counterclockwise whereby the supporter 142 is moved down, only paper media may remain in the carriage 150 and the temporary stack portion 140 may be continuously moved down.

Accordingly, the paper media may be transferred to the carriage 150 and the carriage 150 may continuously move forward towards the medium outlet 115.

Figure 4:
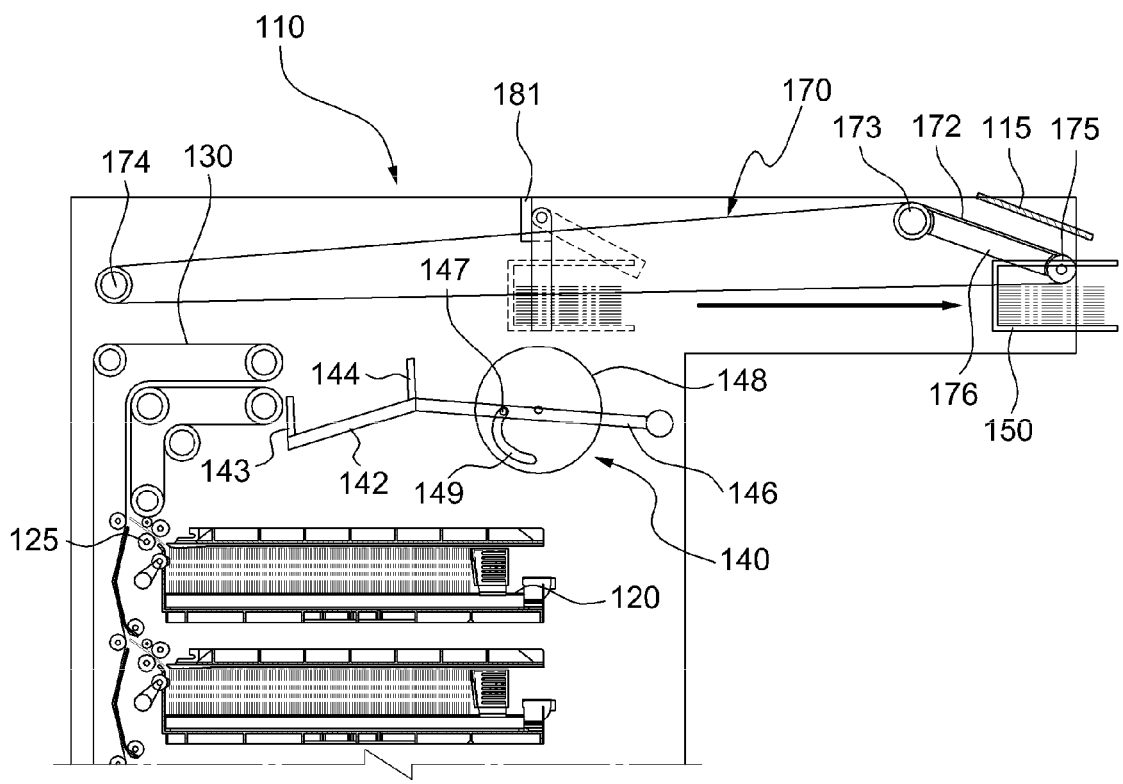

Referring to FIG. 4, the carriage 150 may move forward to the medium outlet 115 together with the paper media. In this instance, although the carriage 150 meets the stopper 180, the carriage 150 may move forward with pushing the stopper 180. Specifically, the stopper 180 may open the travel path of the carriage 150 with performing a pivot motion in the forward direction of the carriage 150 due to the carriage 150.

While the carriage 150 is moving forward to the medium outlet 115, the front moving roller 175 may be moved up whereby a belt droop may occur due to the length of the existing belt 172. When the customer does not collect paper media, the paper media may need to be retrieved. The droop of the belt 172 indicates the pressure by the belt pressing portion 170 is weak, which may interrupt smooth retrieval of paper media.

Figure 5:
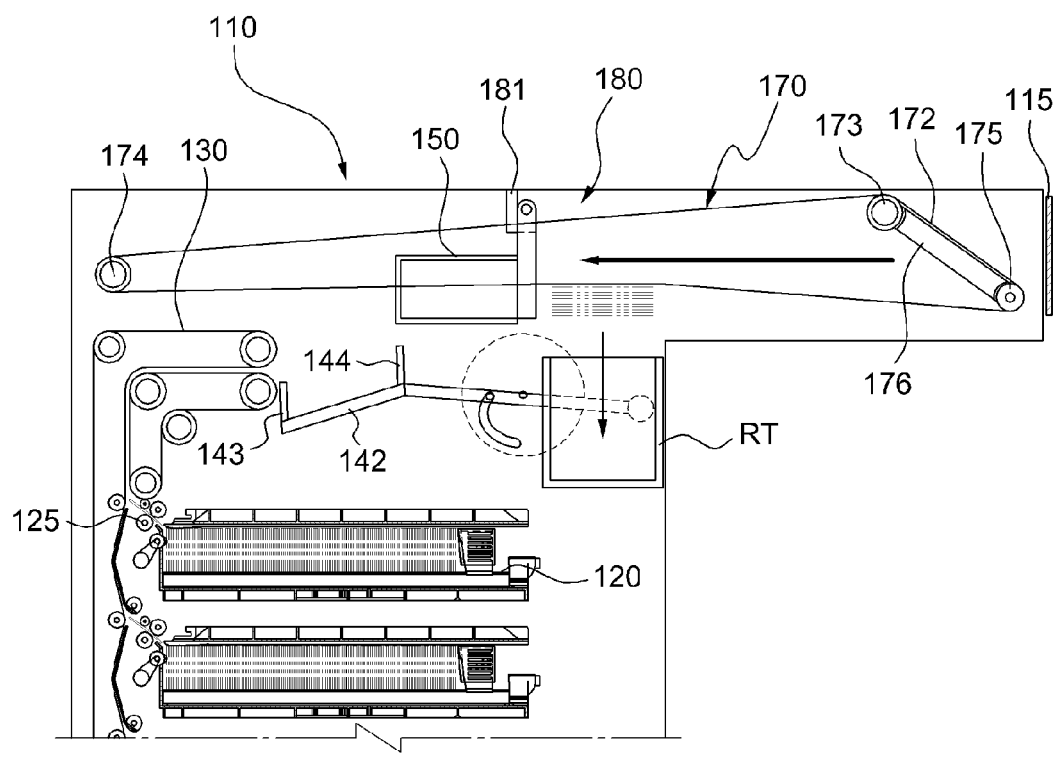

As described above, paper media not collected by the customer may need to be retrieved again. Referring to FIG. 5, the un-collected paper media may be retreated or moved backward again in the state where the paper media is loaded in the carriage 150. Since the belt 172 moves backward pressing the top surface of paper media, it may be possible to maintain the arranged state of the paper media.

When the carriage 150 meets the stopper 180 on the way of moving backward, the paper media may be stopped by the stopper 180. This is because the stopper 180 may not perform a pivot motion in the backward direction of the carriage 150 due to the fixing member 181.

Although the paper media is stopped in the stopper 180, the carriage 150 may continuously move backward. Therefore, the paper media may be separated from the carriage 150. The separated paper media may be collected in the retrieval box that is provided below the stopper 180.

The carriage 150 with the paper media separated may continuously move backward and be positioned to its original location that may transfer a paper medium again.

Hereinafter, a specific shape of each of the carriage 150, the supporter 142 of the temporary stack portion, and the stopper 180 according to an embodiment of the present invention will be described with reference to FIG. 6, FIG. 7, and FIG. 8.

Figure 6:
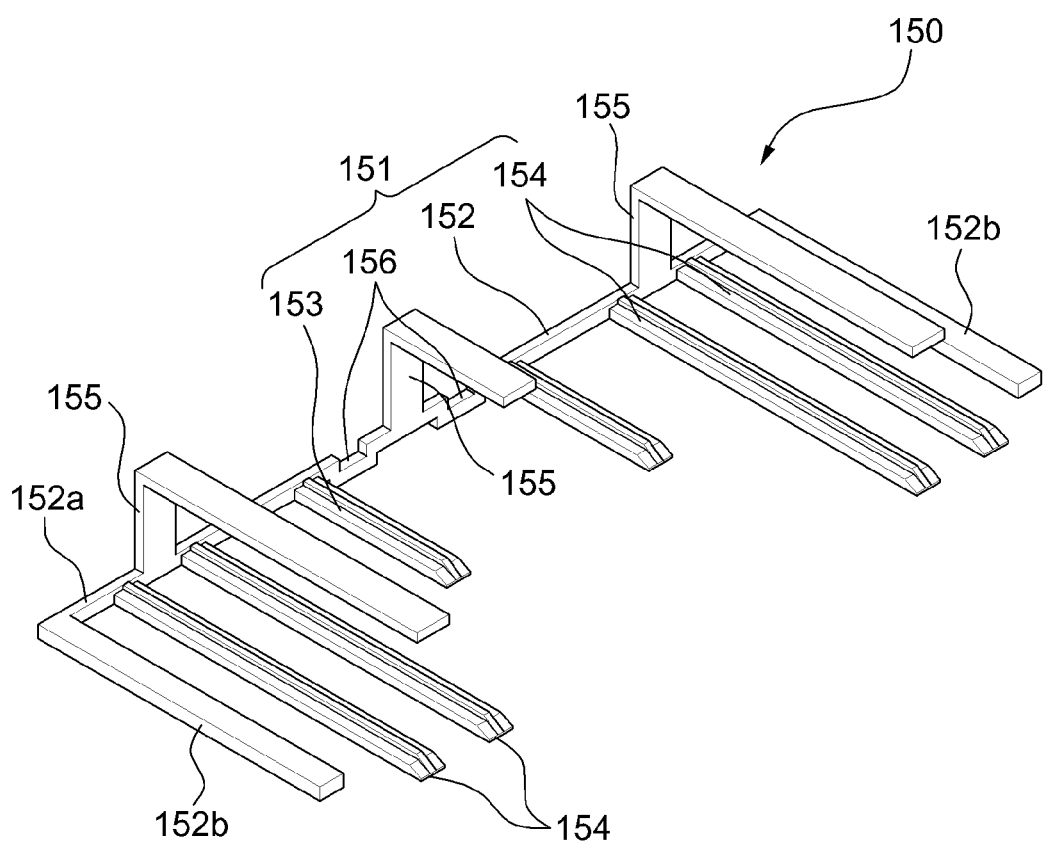
FIG. 6 is a perspective view illustrating a carriage of FIG. 1.
Figure 7:
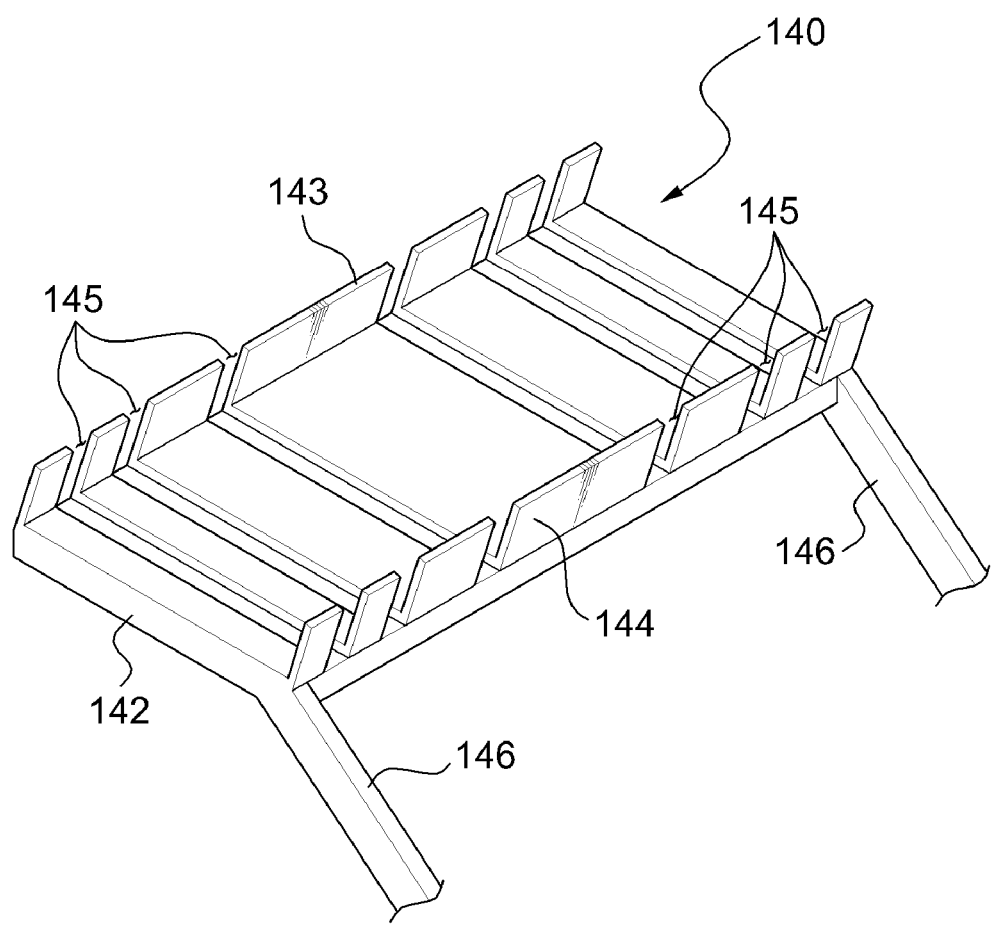
FIG. 7 is a perspective view illustrating constituent elements of a temporary stack portion of FIG. 1.
Figure 8:
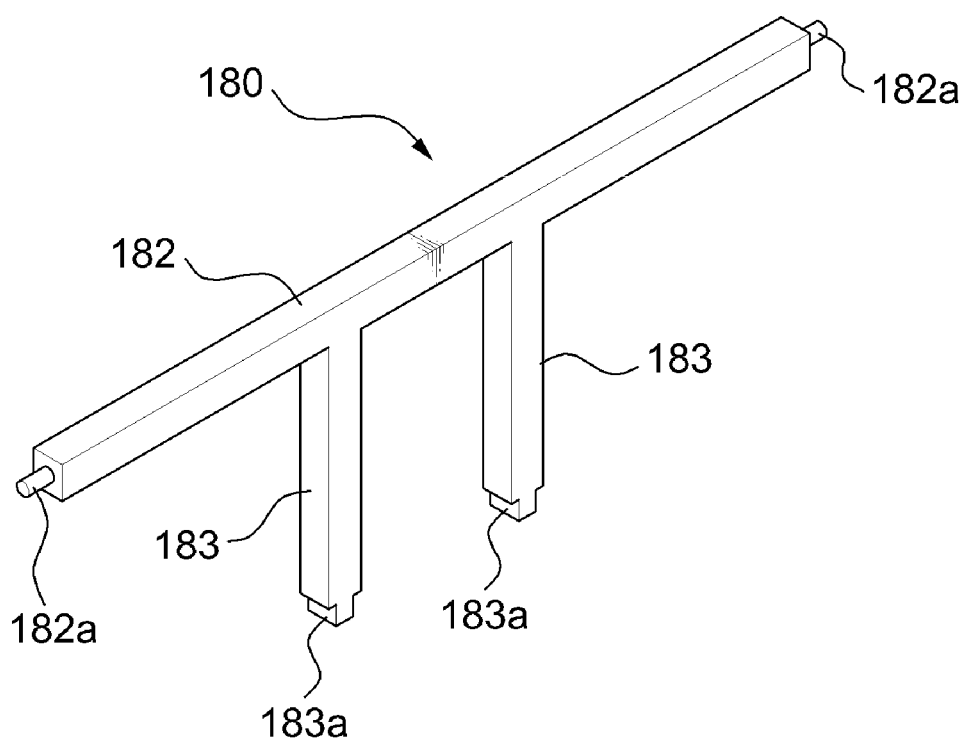
FIG. 8 is a perspective view illustrating a stopper of FIG. 1.

FIG. 6 is a perspective view illustrating the carriage 150 of FIG. 1, FIG. 7 is a perspective view illustrating constituent elements of the temporary stack portion 140 of FIG. 1, and FIG. 8 is a perspective view illustrating the stopper 180 of FIG. 1.

As shown in FIG. 6, the carriage 150 used in the cash transaction machine according to an embodiment of the present invention may include a holder 151 that is provided in parallel with a moving direction of the carriage 150 to support the bottom surface of paper media and a plurality of support portions 155 that is curved from the holder 151 to arrange a lengthwise side of paper media or to support the top surface of the paper media. Here, by arranging the lengthwise side of paper media using the support portion 155, it is possible to maintain an arranged state based on the rear surface of paper media when the paper media moves forward. Also, by supporting the top surface of paper media using the support portion 150, it may sufficiently pressurize a portion that is not pressed by the belt 172.

Also, the support portion 155 includes a cross member 152a that is combined with the belt 172 to be synchronized with the belt 172 and a plurality of fork portions 153 and 154 that is orthogonal to the cross member 152a and is provided in a transfer direction of paper media. Here, both ends of the cross member 152a may be directly combined with the belt 172. Curved combination portions 152b may be provided in both ends of the cross member 152a in order to improve a combining strength between the belt 172 and the cross member 152a. The combination portion 152b may be combined with the belt 172a. The combination portion 152b may be provided in the same direction as the fork portions 153 and 154.

The fork portions 153 and 154 may be spaced apart from each other at a predetermined distance. Accordingly, it is possible to reduce a friction that may occur when paper media is loaded in the fork portions 153 and 154. It is also possible to reduce interference or collision with the temporary stack portion 140. When the spaced distance is greater than the width of the fork portions 153 and 154, it may more advantageously reduce a friction or interference with the temporary stack portion 140.

The fork portions 153 and 154 include a first portion 153 that is formed in an approximately central portion and second fork portions 154 that are formed to be spaced apart from both sides of the first fork portion 153 along the lengthwise direction of paper media or the short-side direction of paper media. In this instance, the length of the first fork portion 153 may be less than the length of the second fork portion 154. So that the customer may withdraw a stack of paper media loaded in the fork portions 153 and 154, the fork portions 153 and 154 may need to be externally exposed from the medium outlet 115 in a state where the paper media is loaded. When a large portion of the fork portions 153 and 154 is exposed from the medium outlet 115, the fork portions 153 and 154 may be damaged. Accordingly, the less exposed the better. For example, when a user pulls the fork portions 153 and 154 externally exposed from the medium outlet 115 with a malicious intent, the cash transaction machine may be damaged. Also, when a large portion of the fork portions 153 and 154 is externally exposed from the medium outlet 115, the customer may have a difficulty in grasping the paper media.

Accordingly, the externally exposed portion from the medium outlet 115 may be reduced by forming the approximately centrally positioned first fork portion 153 to have a relatively shorter length.

The medium outlet 115 may be formed in a shape corresponding to the length of the first fork portion 153 and the second fork portions 154. This is to secure a space for the customer to readily grasp the paper media by forming a central portion of the medium outlet 115 to be externally less protruded. Specifically, it is possible to sufficiently receive the relatively long second fork portions 154 by forming both ends of the medium outlet 115 corresponding to the second fork portions 154 to be protruded towards the customer. Also, the customer may readily and stably grasp the paper media exposed in the central portion of the medium outlet 115 by forming the central portion of the medium outlet 115 to receive only the first fork portion 153.

A stopper interference preventing portion 156 may be provided in the cross member 152a to prevent the collision or interference with the end of the stopper 180. A predetermined number of stopper interference preventing portions 156 may be appropriately provided according to the shape of the stopper 180. The stopper interference preventing portion 156 may be a groove or a stepped portion in the cross member 152a.

As described above, due to the stopper interference preventing portion 156, the end of the stopper 180 may be overlapped with the cross member 152a of the carriage 150. Therefore, even when only a sheet of paper medium remains in the carriage 150, the paper medium may be retrieved by the stopper 180.

Also, a gap may be formed between the fork portions 153 and 154 of the carriage 150. This is to prevent the collision with the temporary stack portion 140.

As shown in FIG. 7, a carriage interference preventing portion 145 may be formed in the supporter 142 of the temporary stack portion 142 to prevent the collision or interference with the fork portions 153 and 154 of the carriage 150.

The carriage interference preventing portion 145 may be a groove or a stepped portion formed on the bottom surface of the supporter 142 to receive the fork portions 153 and 154 of the carriage 150. Specifically, the fork portions 153 and 154 of the carriage may be received in the above grooves or the stepped portions, respectively, to thereby prevent the collision or the interference between the carriage 150 and the temporary stack portion 140.

The top surface of the fork portions 153 and 154 received in the grooves or the stepped portions may have the height less than or equal to the top surface of the supporter 142. When the top surface of the fork portions 153 and 154 received in the grooves or the stepped portions has the height greater than the top surface of the supporter 142 of the temporary stack portion 140, paper media may be stopped in the fork portions 153 and 154 while the paper media is being transferred to the fork portions 153 and 154 of the carriage 150.

The carriage interference preventing portion 145 may be formed on the supporter 142, that is, via the front wall 144 and the rear wall 143, but the carriage interference preventing portion 145 may not be formed in the front wall 144 depending on the shape or the length of the fork portions 153 and 154. In this instance, the front wall 144 and the rear wall 143 may be inclined at a predetermined angle towards the forward direction of the carriage 150. This is to arrange a rear end of the lengthwise side of paper media when the supporter 142 is moved up.

Hereinafter, the specific shape of the stopper 180 will be described with reference to FIG. 8. The stopper 180 includes a bar-shaped mounting portion 182 that is mounted in an upper end portion of the housing 110 across the travel path of paper media and a vertical pivot portion 183 that is integrally formed with the mounting portion 182 to face a downward direction.

Hinge protrusions 182a are formed in both ends of the mounting portion 182, respectively, and may be inserted into the housing 110. An overlapping portion 183a is formed in an end of the pivot portion 183 and may be partially received in the stopper interference preventing portion 156 of the carriage 150. The overlapping portion 183a may be formed in the pivot portion 183 to have a stepped structure, or to have the width less than the pivot portion 183.

The aforementioned shapes of the carriage 150, the temporary stack portion 140, and the stopper 180 are only examples and thus the present invention is not limited thereto.

According to another embodiment of the present invention, there may be provided a cash transaction machine including: a medium storage portion, a medium transfer module transferring a paper medium in a sheet unit from the medium storage portion; a temporary stack portion including an upwardly and downwardly movable supporter that is provided to be adjacent to an outlet of the medium transfer module to stack the paper medium; a clamp receiving the paper medium from the supporter to pressurize the top surface and the bottom surface of the paper medium depending on the thickness of the paper medium; and a clamp transfer portion transferring the clamp.

The remaining constituent elements excluding the clamp will be the same as or similar to the cash transaction machine described above according to an embodiment of the present invention and thus further detailed descriptions will be omitted here.

For example, the clamp transfer portion may include a belt that is synchronized with the clamp to move together with the clamp and a plurality of guide rollers that is provided along a travel path of the clamp to define the travel path of the belt.

Through the above construction, it is possible to enable a stack of paper media to be discharged with maintaining the arranged state and loaded state of stacked paper media and to simplify a transfer structure of the stacked paper media.

If it is possible to simultaneously pressurize the top surface and the bottom surface of the stacked paper media, the clamp may adopt any type of structure. Here, this configuration may need to avoid interference between a temporary stack portion and a stopper.

For example, the clamp may be formed of an elastic member to make it possible to simultaneously pressurize the top surface and the bottom surface of stacked paper media depending on the thickness of stacked paper media. Specifically, when the stack of paper media is transferred to the clamp, the clamp may be transformed from its original shape, generating an elastic restoring force. The clamp may be formed to pressurize the stack of paper media due to the elastic restoring force.

The aforementioned belt pressing portion may be driven by a drive portion that is separately provided from a medium transfer module. Hereinafter, the cash transaction machine of which the belt pressing portion and the medium transfer module are driven by a single drive unit will be described.

Figure 9:
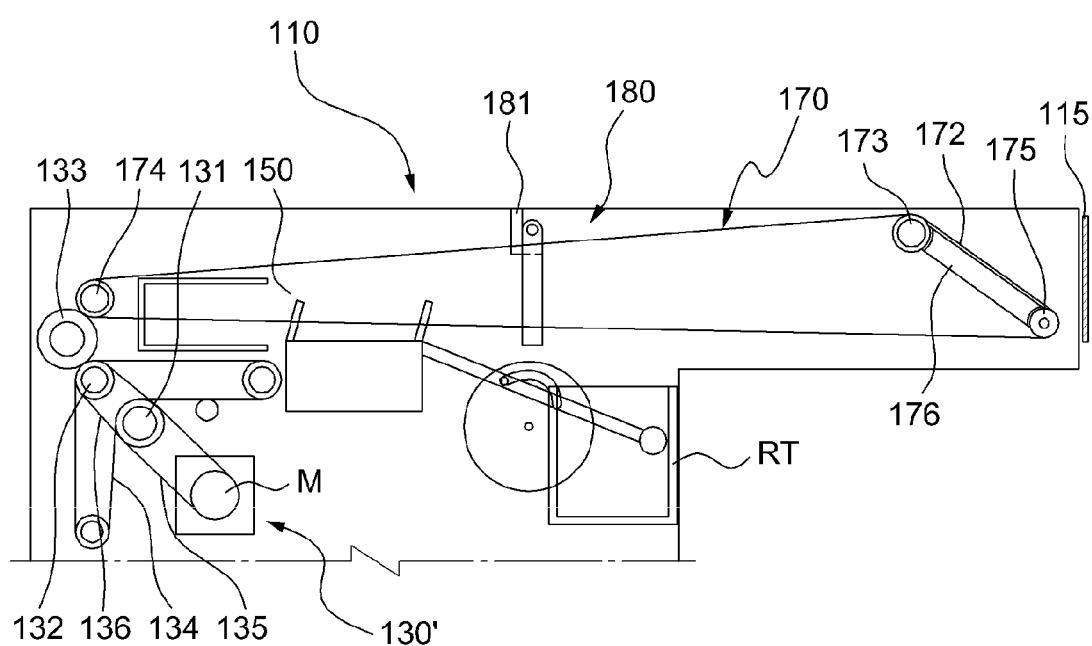
FIG. 9 is a cross-sectional view illustrating a cash transaction machine according to another embodiment of the present invention.

FIG. 9 is a cross-sectional view illustrating a cash transaction machine according to another embodiment of the present invention.

Referring to FIG. 9, the cash transaction machine includes a medium storage portion (not shown); a medium transfer module 130' transferring a paper medium in a sheet unit from the medium storage portion; a temporary stack portion 140 including an upwardly and downwardly movable supporter 142 that is provided to an adjacent to an outlet of the medium transfer module 130' to stack the paper medium; a carriage 150 receiving the paper medium from the supporter 142; a carriage transfer belt 172 transferring the carriage 150 to a medium outlet 115 in a state where stacked paper media is pressed; a plurality of guide rollers 173, 174, and 175 being provided along a travel path of the carriage 150 to define a travel path of the carriage transfer belt 172; and a clutch 133 controlling a power transfer state between the medium transfer module 130' and the carriage transfer belt 172.

The remaining constituent elements excluding the medium transfer module 130' and the clutch 133 will be the same the aforementioned cash transaction machine of FIG. 1, and thus the like reference numerals will be assigned to the like constituent elements. Further detailed descriptions related thereto will be omitted here.

As shown in FIG. 9, the medium transfer module 130' includes an endless belt 134 for transferring the paper medium and a motor M for driving the endless belt 134. The clutch 133 may be provided between the motor M and a rear fixed roller 174 among the guide rollers 173, 174, and 175. In this instance, the clutch 133 may not need to be connected to the rear fixed roller 174. The clutch 133 may be provided in any guide roller that is positioned adjacent to a drive roller of the medium transfer module 130'.

Hereinafter, a drive mechanism of the medium transfer module 130' will be further described. The endless belt 134 may receive a drive force via at least two drive rollers 131 and 132 that are connected to the motor M using other belts 135 and 136. Accordingly, the endless belt 134 of the medium transfer module 130' may directly receive the drive force from the motor M.

The clutch 133 may be provided between the drive roller 132, formed in an upper portion among the drive rollers 131 and 132 of the medium transfer module 130', and the rear fixed roller 174. The clutch 133 functions to transfer the drive force of the motor M, transmitted to the drive roller 132, to the rear fixed roller 174 or to not transfer the drive force.

Specifically, when the carriage 150 is transferring a stack of paper media, the clutch 133 may transfer the drive force of the motor M to the rear fixed roller 174. When the carriage 150 is transferring a sheet of paper medium, the clutch 133 may stop the drive force of the motor M that is being transferred to the rear fixed roller 174. Through the above configuration, a separate motor may not be required to transfer the carriage 150 whereby a manufacturing cost of a product may be reduced.

Figure 10:
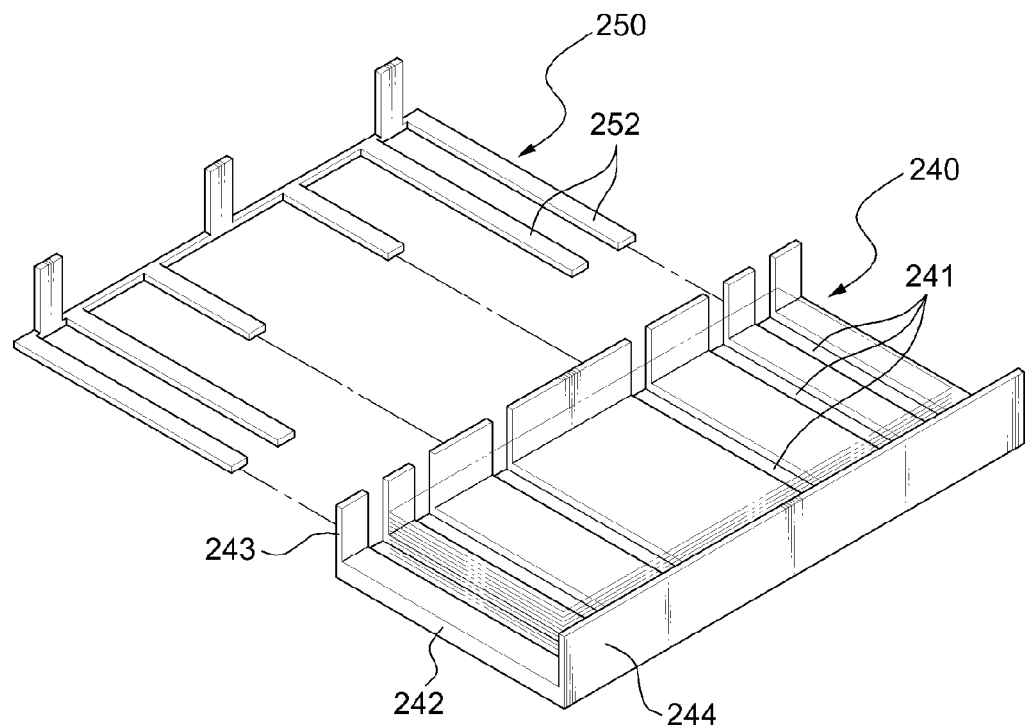
FIG. 10 is a perspective view for describing another embodiment of a temporary stack portion and a carriage of FIG. 1.
Figure 11:
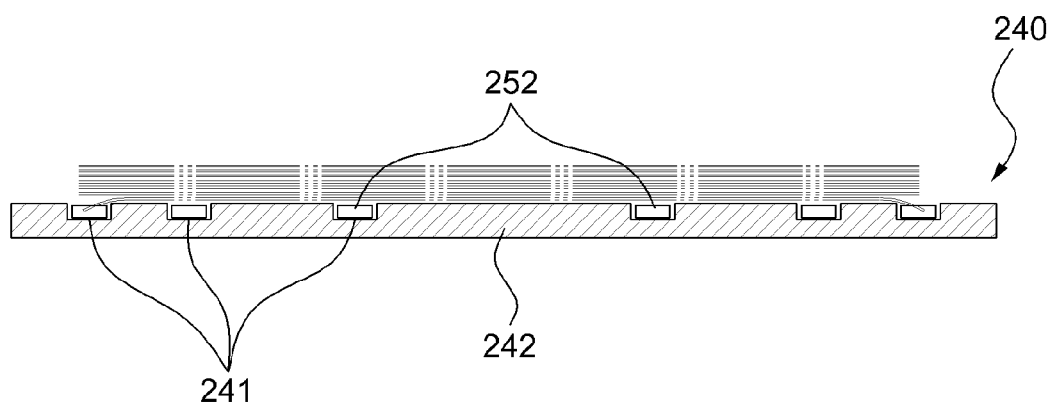
FIG. 11 is a cross-sectional view for describing interference between a temporary stack portion and a carriage of FIG. 10.

FIG. 10 is a perspective view illustrating another embodiment of a temporary stack portion and a carriage of FIG. 1, and FIG. 11 is a cross-sectional view for describing interference between a temporary stack portion 240 and a carriage 250 of FIG. 10.

Referring to FIGS. 10 and 11, a plurality of receiving grooves 241 may be formed on a supporter 242 of the temporary stack portion 240. A plurality of fork portions 252 of the carriage 250 may be inserted into the plurality of receiving grooves 241, respectively. Specifically, the supporter 242 of the temporary stack portion 240 may be moved up to be positioned at the approximately same height as the fork portion 252 of the carriage 250. The carriage 250 may approach the temporary stack portion 240 whereby the fork portions 252 of the carriage 250 may be inserted into the receiving grooves 241 of the temporary stack portion 240, respectively. The supporter 242 may be moved down by leaving only paper media to thereby transfer the paper media to the carriage 250.

Referring again to FIG. 1, the belt pressing portion 170 may be provided above the carriage 250. The belt pressing portion 170 may pressurize the top surface of paper media while the carriage 250 is moving and thereby enable the paper media to be transferred in a well-arranged state.

As indicated by a dotted line, an end portion of paper media may be partially drooped due to its own gravity. The drooped portion may be positioned in the receiving groove 241 to thereby interrupt an entrance of the fork portion 252. When the fork portion 252 enters in a state where the paper media is partially dropped, a bottom paper medium may be pushed away from the carriage 250 by the fork portion 252. The arranged state of paper media may be entirely destroyed to thereby make the transfer of paper media unstable.

Figure 12:
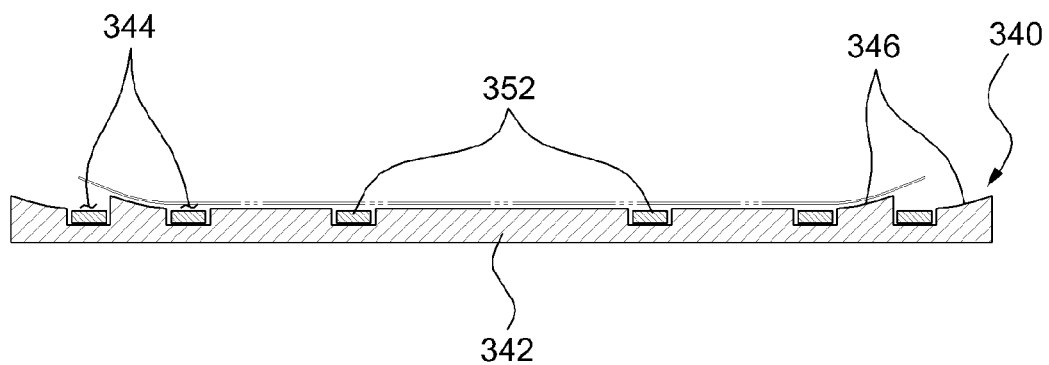
FIG. 12 is a cross-sectional view illustrating another embodiment of a supporter of the temporary stack portion of FIG. 10.

FIG. 12 is a cross-sectional view illustrating another embodiment of the supporter 242 of the temporary stack portion 240 of FIG. 10.

Referring to FIG. 12, a supporter 342 of a temporary stack portion 340 is overlapped with fork portions 352 of a carriage. A plurality of receiving grooves 344 may be formed on the supporter 342 of the temporary stack portion 340. A top surface 346 of the supporter 342 defined between two receiving grooves 344 may be downwardly inclined towards a central portion of the supporter 342.

The inclined top surface 346 of the supporter 342 may be planar, concaved, or protruded. The left top surface 346 of the supporter 342 and the right top surface 346 of the supporter 342 may be symmetrical based on the central portion of the supporter 342. Due to the inclined top surface, an end of paper media may be upwardly curved whereby it is possible to prevent the paper media from being downwardly drooped.

Figure 13:
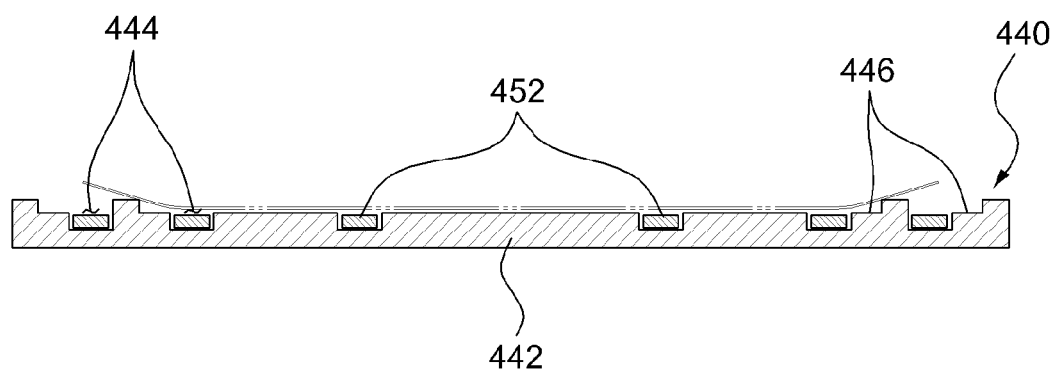
FIG. 13 is a cross-sectional view for describing still another embodiment of the supporter of the temporary stack portion of FIG. 10.

FIG. 13 is a cross-sectional view for describing still another embodiment of the supporter 242 of the temporary stack portion 240 of FIG. 10.

Referring to FIG. 13, a supporter 442 of a temporary stack portion 440 is overlapped with fork portions 452 of a carriage. A plurality of receiving grooves 444 may be formed in the supporter 442 of the temporary stack portion 440. The top surface 446 of the supporter 442 defined between two receiving grooves 444 may have a stepped structure where an outer top surface is relatively higher than an inner top surface based on a central portion of the supporter 442.

The top surface 446 may have at least one stepped structure, and may be formed to be approximately symmetrical. Due to the stepped surface, an end of paper media may be upwardly curved whereby it is possible to prevent the paper media from being downwardly drooped.

Figure 14:
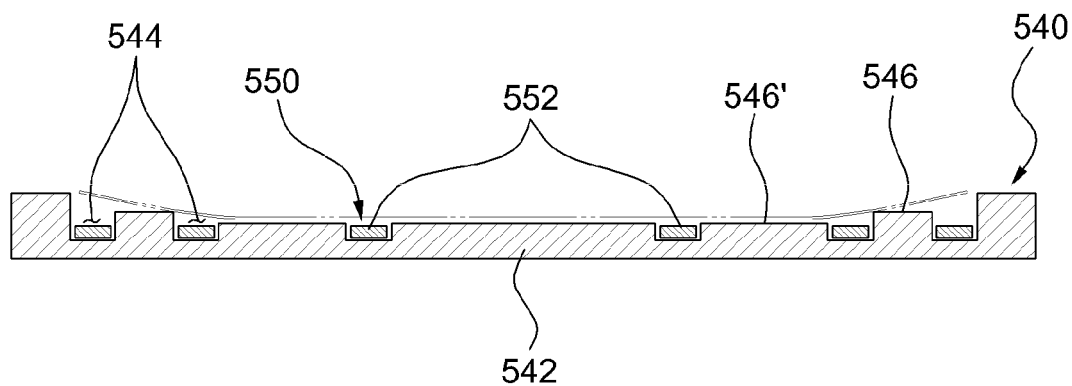
FIG. 14 is a cross-sectional view for describing yet another embodiment of the supporter of the temporary stack portion of FIG. 10.

FIG. 14 is a cross-sectional view for describing yet another embodiment of the supporter 242 of the temporary stack portion 240 of FIG. 10.

Referring to FIG. 14, a supporter 542 of a temporary stack portion 540 is overlapped with fork portions 552 of a carriage. A plurality of receiving grooves 544 may be formed in the supporter 542 of the temporary stack portion 540. A top surface 546 of the supporter 542 defined between two receiving grooves 544 may be formed to be higher than another inner top surface 546' of the supporter 542 based on a central portion of the supporter 542.

The supporter 542 may have a higher top surface as it becomes closer to an outside. The supporter 542 may have a planar top surface, an inclined top surface, a stepped top surface, and the like. Also, the inclined direction or the stepped direction may be formed towards the central portion of the supporter 542 or the outside of the supporter 542. Through this, the supporter 542 may have a symmetrical top surface based on its central portion. Due to the above structure, an end of paper media may be upwardly curved whereby it is possible to prevent the paper media from being downwardly drooped.

Figure 15:
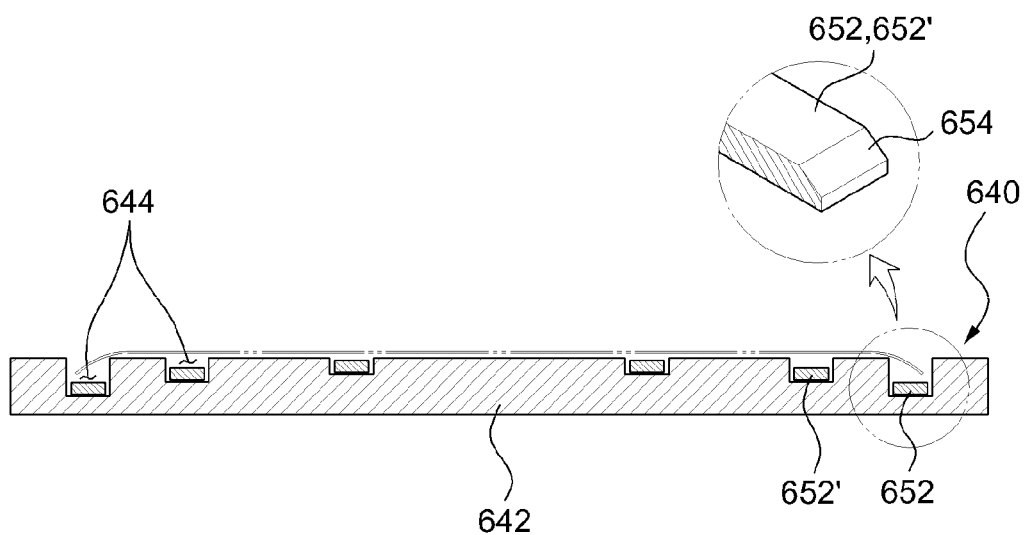
FIG. 15 is a cross-sectional view for describing a further another embodiment of the supporter of the temporary stack portion of FIG. 10.

FIG. 15 is a cross-sectional view for describing a further another embodiment of the supporter 242 of the temporary stack portion 240 of FIG. 10.

Referring to FIG. 15, a supporter 642 of a temporary stack portion 640 is overlapped with fork portions 652 and 625' of a carriage. A plurality of receiving grooves 644 may be formed in the supporter 642 of the temporary stack portion 640. The plurality of fork portions 652 and 652' may be received in the receiving grooves 644, respectively. Among the plurality of fork portions 652 and 625' based on a central portion of the supporter 642, the outer fork portion 652 may be provided in a relatively lower position than the inner fork portion 652'. For this, an outer groove may be further deeply grooved than an inner groove based on the central portion of the supporter 642.

The top surface of the outer fork portion 652 may be provided in a lower location than the top surface of the inner fork portion 652'. Accordingly, although an end of paper media is drooped in the receiving groove, it is possible to reduce interference between the paper media and the fork portion 652. The fork portions 652 and 652' may be symmetrically formed based on the central portion of the supporter 642.

As shown in FIG. 15, a front surface of each of the fork portion 652 and 652' may include an inclined surface 654 towards the front whereby it is possible to further reduce interference between the end of paper media and the fork portions 652 and 652'.

Figure 16:
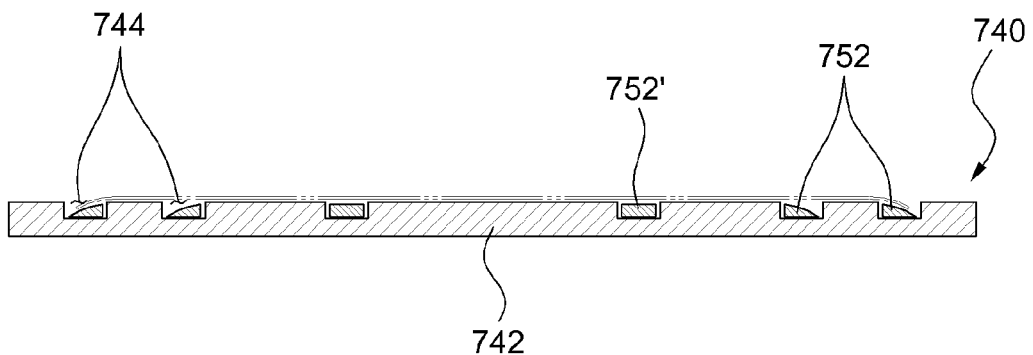
FIG. 16 is a cross-sectional view for describing still another embodiment of the supporter of the temporary stack portion of FIG. 10.

FIG. 16 is a cross-sectional view for describing still another embodiment of the supporter 242 of the temporary stack portion 240 of FIG. 10.

Referring to FIG. 16, a supporter 742 of a temporary stack portion 740 is overlapped with fork portions 752 and 752' of a carriage. A plurality of receiving grooves 744 may be formed in the supporter 742 of the temporary stack portion 740. The plurality of fork portions 752 and 752' may be received in the plurality of receiving grooves 744, respectively. Among the plurality of fork portions 752 and 752' based on a central portion of the supporter 742, the outer fork portions 752 may have a downwardly inclined top surface towards an outside, whereas the inner fork portion 752' may have a planar top surface. Also, all the fork portions may have a downwardly inclined top surface towards the outside based on the central portion of the supporter 742, or may have a different height as described above with reference to FIG. 14.

As described above, the fork portion 752 has a downwardly inclined top surface towards the outside as it becomes closer to the outside. Therefore, although an end of paper media is drooped in the receiving groove 744, it is possible to reduce interference between paper media and the fork portions 752. The fork portions 752 and 752' may be symmetrically formed based on the central portion of the supporter 742.

As described above, according to embodiments of the present invention, since the top surface of a stack of paper media being transferred is pressed using a clamp or a belt, it is possible to prevent the stack of paper media from being scattered during a transfer process.

Also, according to embodiments of the present invention, it is possible to prevent a collision between a carriage and a temporary stack portion while paper media is being transferred from the temporary stack portion to the carriage. Therefore, it is possible to improve a lifetime of the carriage and the temporary stack portion and to secure a product stability.

Also, according to embodiments of the present invention, a stopper may be provided to retrieve an uncollected paper medium and may perform a pivot motion in interoperation with a movement of a carriage. Therefore, it is possible to simplify the structure of a retrieval box for retrieving the uncollected paper medium and to improve a productivity.

Also, according to embodiments of the present invention, a drive force of a medium transfer module may be transferred to a carriage using a clutch without a need for a separate motor for transferring a carriage. Therefore, it is possible to reduce a manufacturing cost and to simplify a carriage transfer structure.

Also, according to embodiments of the present invention, the top surface of a supporter may be formed to locally or entirely have a different height. Therefore, it is possible to prevent partially drooped paper media from causing interference with a fork portion in a receiving groove.

Also, according to embodiments of the present invention, the top surface of a fork portion may be formed to have a different height. Therefore, although a portion of paper medium is drooped in a receiving groove, it is possible to prevent interference between the paper medium and a fork portion in the receiving groove.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A cash transaction machine comprising:
a medium storage portion;
a medium transfer module transferring paper media individually from the medium storage portion;
a temporary stack portion comprising a vertically movable supporter adjacent to an outlet of the medium transfer module to stack the transferred paper media received via the media transfer module;
a carriage receiving the stacked paper medium from the supporter; and
a carriage transfer portion transferring the carriage to a medium outlet while pressing the stacked paper media,
wherein the carriage comprises a holder extending parallel to a moving direction of the carriage to support a bottom surface of the stacked paper media, and a carriage interference preventing portion is formed in the supporter to prevent interference with the holder;
wherein the holder comprises:
a cross member combined with a belt; and
a plurality of fork portions orthogonal to the cross member and extending in a transfer direction of the paper medium.

2. The cash transaction machine of claim 1, wherein the carriage transfer portion comprises:
the belt synchronized with the carriage to move together with the carriage; and
a plurality of guide rollers provided along a travel path of the carriage to define a travel path of the belt,
wherein the stacked paper media is pressed via the belt.

3. The cash transaction machine of claim 2, wherein the carriage further comprises a plurality of support portions being curved from the holder to arrange one lengthwise side of the stacked paper media or to support a top surface of the stacked paper media.

4. The cash transaction machine of claim 2, further comprising:
a stopper retrieving the paper medium loaded in the carriage that moves backward from the medium outlet.

5. The cash transaction machine of claim 4, wherein the stopper is positioned in a path defined by the belt to perform a pivot motion in a forward direction of the carriage.

6. The cash transaction machine of claim 4, wherein a stopper interference preventing portion is formed in the carriage to prevent interference with the stopper.

7. The cash transaction machine of claim 4, wherein, when the carriage moves forward, the paper medium loaded in the carriage is not stopped by the stopper, and when the carriage moves backward, the paper medium loaded in the carriage is stopped by the stopper.

8. The cash transaction machine of claim 1, wherein the plurality of fork portions comprises:
a first fork portion formed in a central portion of the holder: and
a second fork portion spaced apart from each of both sides of the first fork portion along the lengthwise direction of the stacked paper media, and
the length of the first fork portion is less than the length of the second fork portion.

9. The cash transaction machine of claim 8, wherein the medium outlet is formed to correspond to the length of the first fork portion and the second fork portion.

10. The cash transaction machine of claim 1, wherein the carriage interference preventing portion is a groove or a stepped portion on a bottom surface of the supporter to receive the plurality of fork portions.

11. The cash transaction machine of claim 10, wherein a top surface of the fork portions received in the groove or the stepped portion has the height less than or equal to a top surface of the supporter.

12. A cash transaction machine comprising:
a medium storage portion;
a medium transfer module transferring paper media individually from the medium storage portion, wherein the medium transfer module comprises an endless belt transferring the paper medium and a motor driving the endless belt;
a temporary stack portion comprising a vertically movable supporter adjacent to an outlet of the medium transfer module to stack the transferred paper media received via the media transfer module;
a carriage receiving the stacked paper medium from the supporter, wherein the carriage comprises a plurality of fork portions provided in parallel with a moving direction of the carriage, the plurality of fork portions comprises:
a first fork portion formed in a central portion of the holder; and
a second fork portion being spaced apart from each of both sides of the first fork portion along the lengthwise direction of the stacked paper media, and the length of the first fork portion is less than the length of the second fork portion;
a carriage transfer belt transferring the carriage to a medium outlet in a state while pressing the stacked paper media;
a plurality of guide rollers being provided along a travel path of the carriage to define a travel path of the carriage transfer belt;
a clutch between the motor and the one of the guide rollers, the clutch controlling a power transfer state between the medium transfer module and the carriage transfer belt.

13. The cash transaction machine of claim 12, wherein the medium transfer module comprises:
an endless belt transferring the paper medium; and
a motor driving the endless belt, and
the clutch is provided between the motor and one of the guide rollers.

14. The cash transaction machine of claim 13, wherein, when the carriage transfers a stack of paper media, the clutch transfers the power of the motor to the guide roller, and when the carriage transfers a sheet of the paper medium, the clutch cuts off the power of the motor that is transferred to the guide roller.

15. A cash transaction machine comprising:
a medium storage portion;
a medium transfer module transferring a paper medium in a sheet unit from the medium storage portion;
a temporary stack portion comprising an upwardly and downwardly movable supporter that is provided to be adjacent to an outlet of the medium transfer module to stack the paper medium; and
a carriage receiving the paper medium from the supporter to transfer the paper medium to a medium outlet,
wherein the carriage comprises a plurality of fork portions being provided in parallel with a moving direction of the carriage, and the supporter comprises a plurality of receiving grooves receiving the plurality of fork portions respectively, and a top surface of the supporter or the fork portions is formed to have a different height.

16. The cash transaction machine of claim 15, wherein the top surface of the supporter defined between the plurality of receiving grooves is downwardly inclined towards a central portion of the supporter.

17. The cash transaction machine of claim 15, wherein the top surface of the supporter defined between the plurality of receiving grooves has a stepped structure where an outer top surface is relatively higher than an inner top surface based on a central portion of the supporter.

18. The cash transaction machine of claim 15, wherein the top surface of the supporter defined between the plurality of receiving grooves is higher than another inner top surface of the supporter based on a central portion of the supporter.

19. The cash transaction machine of claim 15, wherein an outer fork portion, among the plurality of fork portions based on a central portion of the supporter is provided in a lower location than an inner fork portion.

20. The cash transaction machine of claim 15, wherein an outer fork portion, among the plurality of fork portions based on a central portion of the supporter, includes a downwardly inclined top surface towards an outside.

21. The cash transaction machine of claim 15, wherein a front surface of each of the fork portions includes an inclined surface towards the front.

* * * * *